(12) United States Patent
Li et al.

(10) Patent No.: US 12,514,272 B2
(45) Date of Patent: Jan. 6, 2026

(54) STRAIN OF YARROWIA LIPOLYTICA AND ITS USE IN PREPARING A LOW-SUGAR AND LOW-FAT NUTRITIONAL POWDER OF DESICCATED COCONUT

(71) Applicants: Guangdong Industry Polytechnic, Guangzhou (CN); Jing Li, Guangzhou (CN); Maocheng Deng, Guangzhou (CN)

(72) Inventors: Jing Li, Guangzhou (CN); Maocheng Deng, Guangzhou (CN); Yao Wang, Guangzhou (CN); Sheng Li, Guangzhou (CN); Jidong Gu, Guangzhou (CN); Yongxin Wei, Guangzhou (CN); Shiting Chen, Guangzhou (CN); Fengyu Wu, Guangzhou (CN); Liang Cai, Guangzhou (CN); Huaixing Huang, Guangzhou (CN); Linjie Wu, Guangzhou (CN); Fucheng Wang, Guangzhou (CN); Jiajun Li, Guangzhou (CN); Zhidong Wu, Guangzhou (CN); Jiehua Huang, Guangzhou (CN); Mincong Liao, Guangzhou (CN); Kengchun Lin, Guangzhou (CN); Xiaona Zou, Guangzhou (CN); Xiangyuan Zhao, Guangzhou (CN); Jiewen Xie, Guangzhou (CN)

(73) Assignees: Guangdong Industry Polytechnic, Guangzhou (CN); Maoming Polytechnic, Maoming (CN)

( * ) Notice: Subject to any disclaimer, the term of this patent is extended or adjusted under 35 U.S.C. 154(b) by 826 days.

(21) Appl. No.: 17/770,631

(22) PCT Filed: Jun. 24, 2020

(86) PCT No.: PCT/CN2020/098116
§ 371 (c)(1),
(2) Date: Apr. 21, 2022

(87) PCT Pub. No.: WO2021/077788
PCT Pub. Date: Apr. 29, 2021

(65) Prior Publication Data
US 2022/0287342 A1 Sep. 15, 2022

(30) Foreign Application Priority Data

Oct. 21, 2019 (CN) .......................... 201911001480.2

(51) Int. Cl.
A23L 25/00 (2016.01)
C12N 1/14 (2006.01)
C12N 1/16 (2006.01)
C12R 1/645 (2006.01)

(52) U.S. Cl.
CPC .............. *A23L 25/40* (2016.08); *A23L 25/30* (2016.08); *C12N 1/145* (2021.05); *C12N 1/16* (2013.01); *A23V 2002/00* (2013.01); *C12R 2001/645* (2021.05)

(58) Field of Classification Search
None
See application file for complete search history.

(56) References Cited

FOREIGN PATENT DOCUMENTS

| CN | 102080053 | | 6/2011 | |
| CN | 102080053 | A * | 6/2011 | ............... C12N 1/16 |
| CN | 107164249 | | 9/2017 | |
| CN | 108517329 | | 9/2018 | |

\* cited by examiner

*Primary Examiner* — Jana A Hines
*Assistant Examiner* — Khatol S Shahnan Shah
(74) *Attorney, Agent, or Firm* — JMB Davis Ben-David

(57) ABSTRACT

A strain of *Yarrowia lipolytica* has a deposit number of GDMCC No: 60782, and has been deposited on Sep. 20, 2019, in Guangdong Microbial Culture Collection Center located at Guangdong Institute of Microbiology, 5th Floor, Building 59, No. 100 Xianliezhong Road, Guangzhou City. A low-sugar and low-fat nutritional powder of desiccated coconut is prepared by: mixing a desiccated coconut with water, and heating; then pulping the heat-treated desiccated coconut, homogenizing an obtained coconut milk, adjusting a pH value, and sterilizing, to obtain a desiccated coconut suspension; inoculating a culture solution of the *Yarrowia lipolytica* in the desiccated coconut suspension after being cooled, and fermenting; and sterilizing an obtained fermentation broth, spray drying, and pulverizing, to obtain the low-sugar and low-fat nutritional powder of desiccated coconut. The above-mentioned nutritional powder of desiccated coconut is abundant in nutrition, has a strong coconut flavor, and is suitably used as instant drinks for all people.

8 Claims, 2 Drawing Sheets
Specification includes a Sequence Listing.

```
SEQUENCE LISTING

<160> NUMBER OF SEQ ID NOS: 1

<210> SEQ ID NO 1
<211> LENGTH: 514
<212> TYPE: DNA
<213> ORGANISM: Yarrowia lipolytica

<400> SEQUENCE: 1
tttcatatca ataagcggag gaaaagaaac caacagggat tgcctcagta acggcgagtg      60
aagcggcaaa agctcaaatt tgaaaccctc gggattgtaa tttgaagatt tggcattgga     120
gaaagctaac ccaagttgct tggaatagta cgtcatagag ggtgacaacc ccgtctggct     180
aaccgttctc catgtattgc cttatcaaag agtcgagttg tttgggaatg cagctcaaag     240
tgggtggtaa actccatcta aagctaaata ctggtgagag accgatagcg aacaagtact     300
gtgaaggaaa ggtgaaaaga actttgaaaa gagagtgaaa tagtatgtga aattgttgat     360
agggaaggaa atgagtggag agtggccgag gtttcagccg cccctcgtgg gcggtgtact     420
gccgacgccg agtcatcgat agcgagacga gggttacaaa tgggagcgcc tttcgggcgt     480
tctcccctaa ccctccacac tgccaccgac gaca                                514
```

STRAIN OF YARROWIA LIPOLYTICA AND ITS USE IN PREPARING A LOW-SUGAR AND LOW-FAT NUTRITIONAL POWDER OF DESICCATED COCONUT

CROSS-REFERENCE TO RELATED APPLICATION

This is the U.S. National Stage of International Patent Application No. PCT/CN2020/098116 filed on Jun. 24, 2020, which claims priority to Chinese Patent Application No. 201911001480.2 filed on Oct. 21, 2019.

TECHNICAL FIELD

The present invention belongs to a technical field of microorganism and food processing, and in particular relates to a strain of *Yarrowia lipolytica* and its use in preparing a low-sugar and low-fat nutritional powder of desiccated coconut.

BACKGROUND

Coconut belongs to the Coconut genus from Arecaceae family, and is one of the main woody oil crops in tropical regions. The producing areas for coconut around the whole world include Indonesia, Philippines, India, Sri Lanka, Malaysia, Thailand and Hainan Province in China, with a total production of about 6 billion. A desiccated coconut is a remaining part of a coconut meat after juiced. In general, ingredients of the desiccated coconut are: about 3% of moisture, about 45% of fat, about 2% of sugar, about 8% of protein, about 40% of dietary fiber, and about 2% of ash.

The desiccated coconut is rich in dietary fiber and protein, with extremely high nutritional value and physiological functions. With the improvement of people's living standards, overeating and excessive intake of high-energy substances have resulted in many "sub-health" and "illness of affluence" phenomena. Dietary fiber has a better promoting effect on improving the current dietary structure, attracts extensive attention, and is praised as the seventh nutrient for human beings. A large number of studies have shown that dietary fiber has functions such as improving peristalsis of large intestine, preventing constipation, removing intestinal toxins, preventing colon cancer, lowering blood pressure, lowering blood sugar, lowering cholesterol, and the like. Coconut protein contains 18 kinds of amino acids, in which the ratio of essential amino acids is reasonable, and L-arginine is as high as 14.8%, and it is found by researchers that coconut protein has effects such as lowering blood lipids, lowering cholesterol, improving immunity power, etc.

At present, the desiccated coconut is mainly used for a filling of baked goods, and is relatively low in a price. In order to develop a way for a high value-added utilization of the desiccated coconut, it is necessary to make full use of the dietary fiber and the protein in the desiccated coconut to develop a high-value nutritious food. Due to a rich content of oil and fat in the desiccated coconut, it is not suitable for the desiccated coconut to be directly used as a nutritional food, and a removal treatment is needed to be performed to remove the oil and fat in the coconut.

Currently, there are no reports on the treatment of the oil and fat in the desiccated coconut by biological methods.

SUMMARY

In order to innovate nutritional powder products from a desiccated coconut and solve the problem of low-value application of the desiccated coconut, the inventor of the present invention found a strain of *Yarrowia lipolytica* in a research on the treatment of the oil and fat in the desiccated coconut, which has an excellent ability to decompose the coconut oil. Therefore, a primary object of the present invention is to provide a strain of *Yarrowia lipolytica*.

The second object of the present invention is to provide a use of the *Yarrowia lipolytica* in a food field.

The third object of the present invention is to provide a low-sugar and low-fat nutritional powder of desiccated coconut.

To realize the above-described objects, the present invention is embodied by the following technical solutions:

A strain of *Yarrowia lipolytica*, the name of which is *Yarrowia lipolytica*, YD19, with a deposit number of GDMCC No: 60782, has been deposited on Sep. 20, 2019, in Guangdong Microbial Culture Collection Center which is located at Guangdong Institute of Microbiology, 5th Floor, Building 59, No. 100 Xianliezhong Road, Guangzhou City.

The *Yarrowia lipolytica* can use sugar and fat as carbon sources, has excellent lipolytic performance, and is suitable for application in the food field; and is more suitable for preparing a low-sugar and low-fat nutritional powder of desiccated coconut.

The fat is preferably coconut oil.

A low-sugar and low-fat nutritional powder of desiccated coconut is prepared by the following steps:

(1) a pretreatment of a desiccated coconut: mixing the desiccated coconut with water, and heating in order to soften the desiccated coconut; then pulping the heat-treated desiccated coconut, homogenizing an obtained coconut milk, adjusting a pH value, and sterilizing, to obtain a desiccated coconut suspension;

(2) a fermentation and a post-treatment: inoculating a culture solution of the above-described *Yarrowia lipolytica* in a cooled desiccated coconut suspension, and fermenting; sterilizing an obtained fermentation broth, evaporating and concentrating under reduced pressure, spray drying, and pulverizing, to obtain the low-sugar and low-fat nutritional powder of desiccated coconut.

The water in the step (1) is preferably pure water.

A using amount of the water is preferably calculated according to the mass ratio of desiccated coconut:water=1: (22 to 24).

A condition for the heating in the step (1) is preferably: heating at 120 to 130° C. for 30-60 minutes.

A condition for the pulping in the step (1) is preferably: homogenating at a rotation speed of 6000 to 8000 r/min.

A pressure of the homogenizing in the step (1) is preferably: 30 to 40 MPa.

A number of times for the homogenizing is preferably: 2 to 3 times.

The pH value is preferably: 6.0 to 7.0.

A condition for the sterilizing in the step (1) is preferably: sterilizing at 115 to 121° C. for 10 to 30 min; and is more preferably sterilizing at 121° C. for 10 to 15 min.

The culture solution of the *Yarrowia lipolytica* in the step (2) is preferably a shake flask culture solution; and is preferably prepared by the following steps: inoculating the *Yarrowia lipolytica* in a shake flask culture medium, and culturing under shaking, to obtain the shake flask culture solution.

The shake flask culture medium is preferably prepared from glucose, yeast extract powder, malt extract powder, $KH_2PO_4$, $MgSO_4 \cdot 7H_2O$ and so on, wherein the formula is preferably glucose 25 to 35 g/L, yeast extract powder 3 to 5 g/L, malt extract powder 4 to 6 g/L, KH$_2$PO$_4$ 1 to 3 g/L, and MgSO$_4$·7H$_2$O 0.3 to 0.5 g/L, with pH adjusted to 5.5 to 6.5; and is more preferably glucose 30 g/L, yeast extract powder 4 g/L, malt extract powder 5 g/L, KH$_2$PO$_4$ 2 g/L, and MgSO$_4$·7H$_2$O 0.4 g/L, with pH adjusted to 6.0.

An amount of the shake flask culture medium in the shake flask is preferably 9% to 20%, and more preferably 10% to 20% of a volume of the shake flask.

A condition for the culturing under shaking is preferably: culturing under 160 to 200 r/min at 26 to 28° C. for 18 to 20 h; and is more preferably culturing under 160 to 200 r/min at 27 to 28° C. for 18 to 20 h.

An inoculation amount of the culture solution of the *Yarrowia lipolytica* in the step (2) is preferably 2% to 10% (v/v).

Conditions for the fermenting in the step (2) are preferably that: a rotation speed of stirring is 140 to 200 r/min, a temperature of the fermenting is controlled to 26 to 28° C., an ventilation ratio of the fermenting is 0.16 to 0.48 vvm, and a time of the fermenting is 96 to 120 h; and are more preferably that: the rotation speed of stirring is 140 to 200 r/min, the temperature of the fermenting is controlled to 26 to 28° C., and the time of the fermenting is 96 to 120 h, the ventilation ratio of the fermenting is gradually increased from 0.16 to 0.48 vvm during 0 to 36 h of the fermenting period, the ventilation ratio of the fermenting is controlled to 0.32 vvm in the last 24 hours of the fermenting, and the ventilation ratio of the fermenting is controlled to 0.48 vvm in the middle period of the fermenting.

A condition for the sterilizing in the step (2) is preferably: sterilizing at 105 to 110° C. for 10 to 15 min.

A condition for the evaporating and concentrating under reduced pressure in the step (2) is preferably that: a vacuum degree is 0.07 to 0.08 MPa.

A volume after the evaporating and concentrating under reduced pressure is 30% to 40% of an original volume.

Conditions for the spray drying in the step (2) are preferably that: a temperature of an inlet air is controlled to be 160 to 200° C., and a temperature of an outlet air is controlled to be 70 to 90° C.

A degree of the pulverizing in step (2) is preferably to pulverize until particles reach 200-300 meshes.

The present invention has the following advantages and effects:

(1) The *Yarrowia lipolytica* provided by the present invention can make full use of the oil and fat and the sugar in desiccated coconut as a carbon source. The *Yarrowia* is rich in protein, and its protein contains 8 kinds of amino acids necessary for the human body, and the amino acid ratio is close to a high-quality protein standard recommended by Food and Agriculture Organization of the United Nations (FAO). In addition, the *Yarrowia* also contains the complete B-group vitamins needed by the human body, rich β-1,3-glucan, and various minerals such as zinc, iron, magnesium, copper, selenium, chromium, etc. The desiccated coconut is further processed and utilized by means of the *Yarrowia*, and the obtained product is rich in the *Yarrowia*, the coconut dietary fiber and the coconut protein, which increases the economic value of the *Yarrowia* and the desiccated coconut.

(2) Due to the high content of oil and fat in the desiccated coconut, it cannot be made into superfine dry powder. The present invention utilizes *Yarrowia lipolytica* to degrade the oil and fat and the sugar in the desiccated coconut to prepare superfine nutritional powder of desiccated coconut, which is rich in nutrition with low sugar and low fat, with strong coconut flavor, and is suitable as an instant food for all people.

DETAILED DESCRIPTION OF EMBODIMENTS

Figure 1:
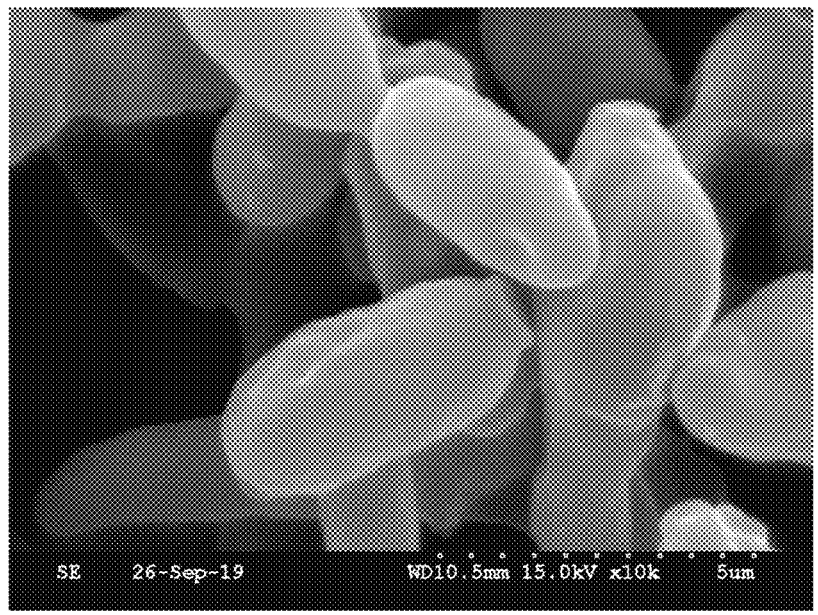
FIG. 1 is a scanning electron microscope photograph figure of fungi of the present invention.

The present invention will be further described in detail below in conjunction with examples and drawings, but embodiments of the present invention are limited thereto. Unless otherwise stated, reagents, methods and apparatuses adopted by the present invention are conventional reagents, methods and apparatuses in this technical field. Unless otherwise stated, reagents and materials used by the present invention are all commercially available.

Example 1

A coconut milk which has been naturally fermented for 5 days is used as a screening material of a strain.

Domesticated culture medium: coconut oil 50 g/L, yeast extract 10 g/L, KH$_2$PO$_4$ 2.5 g/L, and MgSO$_4$·7H$_2$O 0.5 g/L, with pH adjusted to 6.0. The domesticated culture medium is sterilized at 121° C. for 20 min, inoculated in the coconut milk which has been naturally fermented according to an inoculating amount of a volume ratio of 10% after the domesticated culture medium being cooled, and cultured at conditions of 28° C. and 200 rpm for 96 h. Then, the domesticated culture medium is in turn inoculated into a fresh domesticated culture medium according to an inoculating amount of a volume ratio of 10%, and is cultured again for 96 h.

Plate screening culture medium: peptone 20 g/L, beef extract 10 g/L, chloramphenicol 100 mg/L, and agar 20 g/L, with pH adjusted to 6.0. The plate screening culture medium is sterilized at 121° C. for 20 min, poured into a sterile petri dish while it is still hot, and condensed to form a plate. Under sterile operating conditions, a sterile coconut oil is coated on the plate, then the gradient dilution of the domesticated culture medium is coated on the plate, and the same is cultured at 28° C. for 72 h.

YEPD medium is used as a slant medium. Under sterile operating conditions, 60 single colonies on the plate are picked with an inoculating needle, respectively inoculated into the slant medium, cultured at 28° C., and placed in a reregister at 4° C. after a lawn grows, to preserve for use.

Shake flask screening medium: coconut oil 50 g/L, yeast extract 10 g/L, KH$_2$PO$_4$ 2.5 g/L, and MgSO$_4$·7H$_2$ 0.5 g/L, with pH adjusted to 6.0. The shake flask culture medium is sterilized at 121° C. for 20 min, and 60 slant strains are respectively inoculated in with 1 ring for each bottle after the medium being cooled, and then cultured at conditions of 28° C. and 200 rpm for 120 h. A shake flask culture solution is centrifuged at a condition of 6000 r/min for 20 min, and a supernatant is collected. The residual oil and fat in the supernatant is extracted twice by means of n-hexane with an equal volume, the extraction layers are combined, and the n-hexane in the extraction layers is removed with a rotary vacuum evaporator at 60° C. A quality of the residual oil and fat is determined, a degradation rate of the coconut oil is calculated, and a strain with the highest degradation rate is screened out, which is the strain of the present invention.

A thallus morphology of this strain is observed by using a scanning electron microscope, which is consistent with that of common yeast (as shown in FIG. 1). 26S rDNA of this strain is analyzed by using a molecular identification method, and searched and aligned on the NCBI data platform. This strain is determined to be *Yarrowia lipolytica*. The 26S rDNA of this strain is shown below.

(SEQ ID NO: 1)
TTTCATATCAATAAGCGGAGGAAAAGAAACCAACAGGGATTGCCTCAGTAA

CGGCGAGTGAAGCGGCAAAAGCTCAAATTTGAAACCCTCGGGATTGTAATT

TGAAGATTTGGCATTGGAGAAAGCTAACCCAAGTTGCTTGGAATAGTACGT

CATAGAGGGTGACAACCCCGTCTGGCTAACCGTTCTCCATGTATTGCCTTA

TCAAAGAGTCGAGTTGTTTGGGAATGCAGCTCAAAGTGGGTGGTAAACTCC

ATCTAAAGCTAAATACTGGTGAGAGACCGATAGCGAACAAGTACTGTGAAG

GAAAGGTGAAAAGAACTTTGAAAAGAGAGTGAAATAGTATGTGAAATTGTT

GATAGGGAAGGAAATGAGTGGAGAGTGGCCGAGGTTTCAGCCGCCCCTCGT

GGGCGGTGTACTGCCGACGCCGAGTCATCGATAGCGAGACGAGGGTTACAA

ATGGGAGCGCCTTTCGGGCGTTCTCCCCTAACCCTCCACACTGCCACCGAC

GACA.

This strain is named as *Yarrowia lipolytica* YD19, which has been deposited on Sep. 20, 2019, in Guangdong Microbial Culture Collection Center which is located at Guangdong Institute of Microbiology, 5th Floor, Building 59, No. 100 Xianliezhong Road, Guangzhou City, with a deposit number of GDMCC No: 60782.

Example 2

Figure 2:
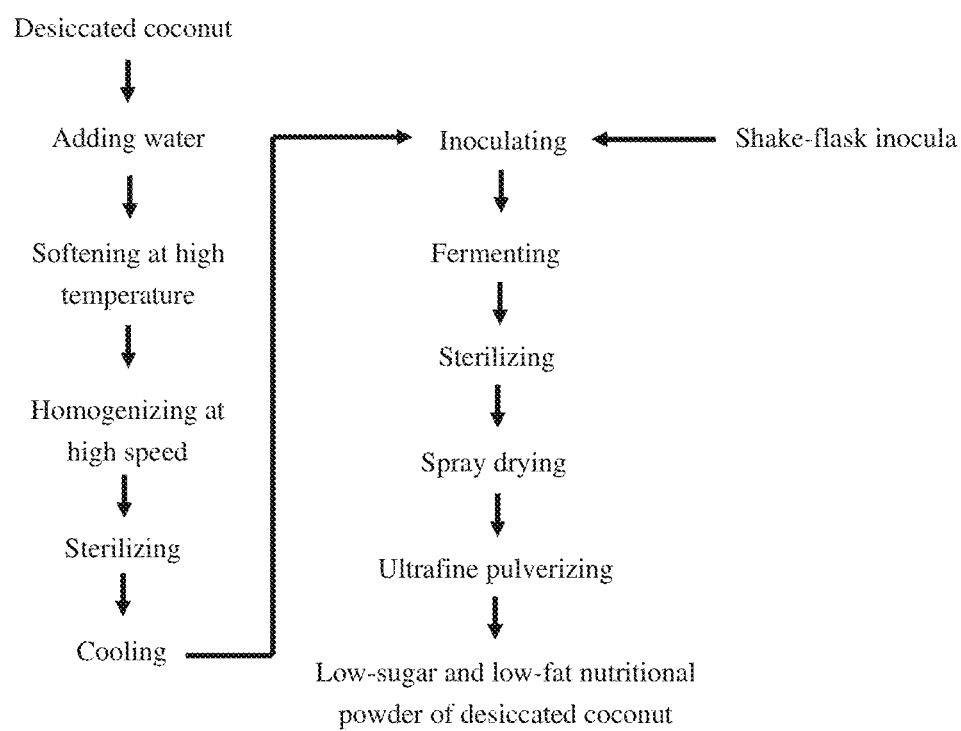
FIG. 2 is a process flow diagram of the present invention.

A manufacturing process of a low-sugar and low-fat nutritional powder of desiccated coconut, shown in FIG. 2, is specifically as follows:
(1) Pretreatment of Desiccated Coconut
0.75 kg of dry desiccated coconut is weighed, 18 kg of pure water is added, and a mixture is heated for 30 min at a condition of 130° C. to soften the desiccated coconut. At a condition of 6000 r/min, a mixed liquid is pulped with a high-speed refiner, and then homogenizing is performed for 3 times under a pressure of 30 MPa with a high-pressure homogenizer. pH is adjusted to 7.0, and the same is put in a fermentation tank. Sterilizing is performed at 121° C. for 10 min, followed by cooling to room temperature, ready for use.
(2) Fermentation and Post-Treatment of Desiccated Coconut Suspension
54 g of glucose, 7.2 g of yeast extract powder, 9 g of malt extract powder, 3.6 g of $KH_2PO_4$, and 0.72 g of $MgSO_4 \cdot 7H_2O$ are weighed, water is added for dissolution, and a volume is determined to be 1.8 L with pH adjusted to 6.0. A mixed liquid is distributed to twelve 1000 mL Erlenmeyer flasks with 150 mL of the liquid filled into each flask. Sterilizing is performed at 121° C. for 20 min, 1 ring of a lawn of the *Yarrowia lipolytica* GDMCC No: 60782 slant strain is inoculated in after the flasks being cooled, and culturing is carried out at conditions of 180 r/min and 27° C. for 19 h, to obtain a shake flask culture solution of the *Yarrowia*.
1.8 L of the shake flask culture solution of the *Yarrowia* is inoculated into a fermentation tank, stirring is started, and a sterile air is introduced in so as to ferment for 96 h. During the fermenting process, a rotation speed of the stirring for the fermentation tank is controlled to 170 r/min, and a temperature for the fermenting is controlled to 27 to 28° C.; according to the demand for a dissolved oxygen of the fermenting, a ventilation ratio is gradually increased from 0.16 vvm to 0.48 vvm during the 0 to 24th hour of the fermenting, the ventilation ratio is controlled to 0.48 vvm during the 24th to 72nd hour of the fermenting, and the ventilation ratio is controlled to 0.32 vvm after 72 hours of the fermenting.

After the fermenting is complete, sterilizing is performed on a fermentation broth at 105° C. for 15 min, and evaporating and concentrating is performed on the fermentation broth under a condition of a vacuum degree of 0.07 MPa to a volume decreased to 30% from the original volume, and then spray drying is performed. During the spray drying process, a temperature of an inlet air is controlled to 190 to 200° C., and a temperature of an outlet air is controlled to 80 to 90° C., to obtain 542 g of a dried product with a moisture content of 2.2%. The dried product is pulverized to 200 to 300 meshes by using an ultrafine pulverizer, to obtain the low-sugar and low-fat nutritional powder of desiccated coconut. After detecting, the nutritional powder of desiccated coconut has a protein content of 21.8%, a dietary fiber content of 59.4%, a B-group vitamin content of 0.016%, and a fat content of 0.53%, while glucose, fructose, sucrose, maltose, and the like are not detected. A product of the low-sugar and low-fat nutritional powder of desiccated coconut brewed with water has a strong coconut flavor.

Example 3

A manufacturing process of a low-sugar and low-fat nutritional powder of desiccated coconut, shown in FIG. 2, is specifically as follows:
(1) Pretreatment of Desiccated Coconut 0.954 kg of dry desiccated coconut is weighed, 21 kg of pure water is added, and a mixed liquid is heated for 60 min at a condition of 120° C. to soften the desiccated coconut. At a condition of 8000 r/min, the mixed liquid is pulped with a high-speed refiner, homogenizing is then performed for 2 times under a pressure of 40 MPa with a high-pressure homogenizer with pH adjusted to 6.0, and the same is put in a fermentation tank. Sterilizing is performed at 121° C. for 15 min, followed by cooling to room temperature, ready for use.
(2) Fermentation and Post-Treatment of Desiccated Coconut Suspension 42 g of glucose, 5.6 g of yeast extract powder, 7 g of malt extract powder, 2.8 g of $KH_2PO_4$, and 0.56 g of $MgSO_4 \cdot 7H_2O$ are weighed, water is added for dissolution, and a volume is determined to be 1.4 L with pH adjusted to 6.0. A mixed liquid is distributed to seven 1000 mL Erlenmeyer flasks with 200 mL of the liquid filled into each flask. Sterilizing is performed at 121° C. for 20 min, 1 ring of a lawn of the *Yarrowia lipolytica* GDMCC No: 60782 slant strain is inoculated in after the flasks being cooled, and culturing is carried out at conditions of 200 r/min and 28° C. for 18 h, to obtain a shake flask culture solution of the *Yarrowia*.
1.4 L of the shake flask culture solution of the *Yarrowia* is inoculated into a fermentation tank, stirring is started, and a sterile air is introduced in so as to ferment for 108 h. During the fermenting process, a rotation speed of the stirring for the fermentation tank is controlled to 140 r/min, and a temperature for the fermenting is controlled to 26 to 27° C.; according to the demand for a dissolved oxygen of the fermenting, a ventilation ratio is gradually increased from 0.16 vvm to 0.48 vvm during the 0 to 30th hour of the fermenting, the ventilation ratio is controlled to 0.48 vvm during the 30th to 84th hour of the fermenting, and the ventilation ratio is controlled to 0.32 vvm after 84 hours of the fermenting.

After the fermenting is complete, sterilizing is performed on a fermentation broth at 110° C. for 10 min, and evaporating and concentrating is performed on the fermentation broth under a condition of a vacuum degree of 0.075 MPa to a volume decreased to 40% from the original volume, and then spray drying is performed. During the spray drying process, a temperature of an inlet air is controlled to 170 to 180° C., and a temperature of an outlet air is controlled to 75 to 85° C., to obtain 676 g of a dried product with a moisture content of 2.4%. The dried product is pulverized to 200 to 300 meshes by using an ultrafine pulverizer, to obtain the low-sugar and low-fat nutritional powder of desiccated coconut. After detecting, the nutritional powder of desiccated coconut has a protein content of 24.4%, a dietary fiber content of 57.4%, a B-group vitamin content of 0.017%, and a fat content of 0.54%, while glucose, fructose, sucrose, maltose, and the like are not detected. A product of the low-sugar and low-fat nutritional powder of desiccated coconut brewed with water has a strong coconut flavor.

Example 4

A manufacturing process of a low-sugar and low-fat nutritional powder of desiccated coconut, shown in FIG. 2, is specifically as follows:
(1) Pretreatment of Desiccated Coconut
0.869 kg of dry desiccated coconut is weighed, 20 kg of pure water is added, and a mixed liquid is heated for 45 min at a condition of 125° C. to soften the desiccated coconut. At a condition of 7000 r/min, the mixed liquid is pulped with a high-speed refiner, homogenizing is then performed for 3 times under a pressure of 35 MPa with a high-pressure homogenizer with pH adjusted to 6.5, and the same is put in a fermentation tank. Sterilizing is performed at 121° C. for 12 min, followed by cooling to room temperature, ready for use.
(2) Fermentation and Post-Treatment of Desiccated Coconut Suspension
12 g of glucose, 1.6 g of yeast extract powder, 2 g of malt extract powder, 0.8 g of $KH_2PO_4$, and 0.16 g of $MgSO_4 \cdot 7H_2O$ are weighed, water is added for dissolution, and a volume is determined to be 0.4 L with pH adjusted to 6.5. A mixed liquid is distributed to four 1000 mL Erlenmeyer flasks with 100 mL of the liquid filled into each flask. Sterilizing is performed at 121° C. for 20 min, 1 ring of a lawn of the *Yarrowia lipolytica* GDMCC No: 60782 slant strain is inoculated in after the flasks being cooled, and culturing is carried out at conditions of 200 r/min and 28° C. for 20 h, to obtain a shake flask culture solution of the *Yarrowia*.

0.4 L of the shake flask culture solution of the *Yarrowia* is inoculated into a fermentation tank, stirring is started, and a sterile air is introduced in so as to ferment for 120 h. During the fermenting process, a rotation speed of the stirring for the fermentation tank is controlled to 200 r/min, and a temperature for the fermenting is controlled to 27 to 28° C.; according to the demand for a dissolved oxygen of the fermenting, a ventilation ratio is gradually increased from 0.16 vvm to 0.48 vvm during the 0 to 36th hour of the fermenting, the ventilation ratio is controlled to 0.48 vvm during the 36th to 96th hour of the fermenting, and the ventilation ratio is controlled to 0.32 vvm after 96 hours of the fermenting.

After the fermenting is complete, sterilizing is performed on a fermentation broth at 108° C. for 12 min, and evaporating and concentrating is performed on the fermentation broth under a condition of a vacuum degree of 0.08 MPa to a volume decreased to 35% from the original volume, and then spray drying is performed. During the spray drying process, a temperature of an inlet air is controlled to 160 to 170° C., and a temperature of an outlet air is controlled to 70 to 80° C., to obtain 637 g of a dried product with a moisture content of 2.7%. The dried product is pulverized to 200 to 300 meshes by using an ultrafine pulverizer, to obtain the low-sugar and low-fat nutritional powder of desiccated coconut. After detecting, the nutritional powder of desiccated coconut has a protein content of 23.6%, a dietary fiber content of 58.1%, a B-group vitamin content of 0.017%, and a fat content of 0.53%, while glucose, fructose, sucrose, maltose, and the like are not detected. A product of the low-sugar and low-fat nutritional powder of desiccated coconut brewed with water has a strong coconut flavor.

Comparative Example 1

(1) Pretreatment of Desiccated Coconut
0.75 kg of dry desiccated coconut is weighed, 18 kg of pure water is added, and a mixed liquid is heated for 30 min at a condition of 130° C. to soften the desiccated coconut. At a condition of 6000 r/min, the mixed liquid is pulped with a high-speed refiner, homogenizing is then performed for 3 times under a pressure of 30 MPa with a high-pressure homogenizer with pH adjusted to 7.0. Sterilizing is performed at 121° C. for 10 min, followed by cooling to room temperature, ready for use.
(2) Post-Treatment of Desiccated Coconut Suspension
Without being fermented, the desiccated coconut suspension is directly suffered to evaporating and concentrating to a volume decreased to 30% under a condition of a vacuum degree of 0.07 MPa, and then spray drying by using a spray drying tower. During the spray drying process, a temperature of an inlet air is controlled to 190 to 200° C., and a temperature of an outlet air is controlled to 80 to 90° C. A dry powder cannot be obtained because of a high content of oil and fat.

Comparative Example 2

(1) Pretreatment of Desiccated Coconut
0.75 kg of dry desiccated coconut is weighed, 18 kg of pure water is added, and a mixed liquid is heated for 30 min at a condition of 130° C. to soften the desiccated coconut. At a condition of 6000 r/min, the mixed liquid is pulped with a high-speed refiner, homogenizing is then performed for 3 times under a pressure of 30 MPa with a high-pressure homogenizer with pH adjusted to 7.0, and the same is put in a fermentation tank. Sterilizing is performed at 121° C. for 10 min, followed by cooling to room temperature, ready for use.
(2) Fermentation and Post-Treatment of Desiccated Coconut Suspension
54 g of glucose, 7.2 g of yeast extract powder, 9 g of malt extract powder, 3.6 g of $KH_2PO_4$, and 0.72 g of $MgSO_4 \cdot 7H_2O$ are weighed, water is added for dissolution, and a volume is determined to be 1.8 L with pH adjusted to 6.0. A mixed liquid is distributed to twelve 1000 mL Erlenmeyer flasks with 150 mL of the liquid filled into each flask. Sterilizing is performed at 121° C. for 20 min, 1 ring of a lawn of the *Saccharomyces cerevisiae* CICC1252 (which is purchased from China Center of Industrial Culture Collection) slant strain is inoculated in after the flasks being cooled, and culturing is carried out at conditions of 180 r/min and 27° C. for 19 h, to obtain a shake flask culture solution of the *Saccharomyces cerevisiae*.

1.8 L of the shake flask culture solution of the *Saccharomyces cerevisiae* is inoculated into a fermentation tank, stirring is started, and a sterile air is introduced in so as to ferment for 96 h. During the fermenting process, a rotation speed of the stirring for the fermentation tank is controlled to 170 r/min, and a temperature for the fermenting is controlled to 27 to 28° C.; according to the demand for a dissolved oxygen of the fermenting, a ventilation ratio is gradually increased from 0.16 vvm to 0.48 vvm during the 0 to 24th hour of the fermenting, the ventilation ratio is controlled to 0.48 vvm during the 24th to 72nd hour of the fermenting, and the ventilation ratio is controlled to 0.32 vvm after 72 hours of the fermenting.

After the fermenting is complete, sterilizing is performed on a fermentation broth at 105° C. for 15 min, evaporating and concentrating is performed on the fermentation broth under a condition of a vacuum degree of 0.07 MPa, and then spray drying is performed. During the spray drying process, a temperature of an inlet air is controlled to 190 to 200° C., and a temperature of an outlet air is controlled to 80 to 90° C. A dry powder cannot be obtained because of a high content of oil and fat.

Comparative Example 3

(1) Pretreatment of Desiccated Coconut 0.75 kg of dry desiccated coconut is weighed, 18 kg of pure water is added, and a mixed liquid is heated for 30 min at a condition of 130° C. to soften the desiccated coconut. At a condition of 6000 r/min, the mixed liquid is pulped with a high-speed refiner, homogenizing is then performed for 3 times under a pressure of 30 MPa with a high-pressure homogenizer with pH adjusted to 7.0, and the same is put in a fermentation tank. Sterilizing is performed at 121° C. for 10 min, followed by cooling to room temperature, ready for use.

(2) Fermentation and Post-Treatment of Desiccated Coconut Suspension 54 g of glucose, 7.2 g of yeast extract powder, 9 g of malt extract powder, 3.6 g of $KH_2PO_4$, and 0.72 g of $MgSO_4 \cdot 7H_2O$ are weighed, water is added for dissolution, and a volume is determined to be 1.8 L with pH adjusted to 6.0. A mixed liquid is distributed to twelve 1000 mL Erlenmeyer flasks with 150 mL of the liquid filled into each flask. Sterilizing is performed at 121° C. for 20 min, 1 ring of a lawn of the *Yarrowia lipolytica* CICC31120 (which is purchased from China Center of Industrial Culture Collection) slant strain is inoculated in after the flasks being cooled, and culturing is carried out at conditions of 180 r/min and 27° C. for 19 h, to obtain a shake flask culture solution of the *Yarrowia*.

1.8 L of the shake flask culture solution of the *Yarrowia* is inoculated into a fermentation tank, stirring is started, and a sterile air is introduced in so as to ferment for 96 h. During the fermenting process, a rotation speed of the stirring for the fermentation tank is controlled to 170 r/min, and a temperature for the fermenting is controlled to 27 to 28° C.; according to the demand for a dissolved oxygen of the fermenting, a ventilation ratio is gradually increased from 0.16 vvm to 0.48 vvm during the 0 to 24th hour of the fermenting, the ventilation ratio is controlled to 0.48 vvm during the 24th to 72nd hour of the fermenting, and the ventilation ratio is controlled to 0.32 vvm after 72 hours of the fermenting.

After the fermenting is complete, sterilizing is performed on a fermentation broth at 105° C. for 15 min, and evaporating and concentrating is performed on the fermentation broth under a condition of a vacuum degree of 0.07 MPa, and then spray drying is performed. During the spray drying process, a temperature of an inlet air is controlled to 190 to 200° C., and a temperature of an outlet air is controlled to 80 to 90° C. A dry powder cannot be obtained because of a high content of oil and fat.

Comparative Example 4

(1) Pretreatment of Desiccated Coconut 0.75 kg of dry desiccated coconut is weighed, 18 kg of pure water is added, and a mixed liquid is heated for 30 min at a condition of 130° C. to soften the desiccated coconut. At a condition of 6000 r/min, the mixed liquid is pulped with a high-speed refiner with pH adjusted to 7.0, and the same is put in a fermentation tank. Sterilizing is performed at 121° C. for 10 min, followed by cooling to room temperature, ready for use.

(2) Fermentation and Post-Treatment of Desiccated Coconut Suspension 54 g of glucose, 7.2 g of yeast extract powder, 9 g of malt extract powder, 3.6 g of $KH_2PO_4$, and 0.72 g of $MgSO_4 \cdot 7H_2O$ are weighed, water is added for dissolution, and a volume is determined to be 1.8 L with pH adjusted to 6.0. A mixed liquid is distributed to twelve 1000 mL Erlenmeyer flasks with 150 mL of the liquid filled into each flask. Sterilizing is performed at 121° C. for 20 min, 1 ring of a lawn of the *Candida utilis* CICC31126 (which is purchased from China Center of Industrial Culture Collection) slant strain is inoculated in after the flasks being cooled, and culturing is carried out at conditions of 180 r/min and 27° C. for 19 h, to obtain a shake flask culture solution of the *Candida utilis*.

1.8 L of the shake flask culture solution of the *Candida utilis* is inoculated into a fermentation tank, stirring is started, and a sterile air is introduced in so as to ferment for 96 h. During the fermenting process, a rotation speed of the stirring for the fermentation tank is controlled to 170 r/min, and a temperature for the fermenting is controlled to 27 to 28° C.; according to the demand for a dissolved oxygen of the fermenting, a ventilation ratio is gradually increased from 0.16 vvm to 0.48 vvm during the 0 to 24th hour of the fermenting, the ventilation ratio is controlled to 0.48 vvm during the 24th to 72nd hour of the fermenting, and the ventilation ratio is controlled to 0.32 vvm after 72 hours of the fermenting.

After the fermenting is complete, homogenizing is performed on a fermentation broth for 3 times under a pressure of 30 MPa with a high-pressure homogenizer, sterilizing is performed on the fermentation broth at 105° C. for 15 min, and evaporating and concentrating is then performed on the fermentation broth to a volume of 30% under a condition of a vacuum degree of 0.07 MPa, and then spray drying is performed. During the spray drying process, a temperature of an inlet air is controlled to 190 to 200° C., and a temperature of an outlet air is controlled to 80 to 90° C. A dry powder cannot be obtained because of a high content of oil and fat.

Comparative Example 5

(1) Pretreatment of Desiccated Coconut 0.75 kg of dry desiccated coconut is weighed, 18 kg of pure water is added, and a mixed liquid is heated for 30 min at a condition of 130° C. to soften the desiccated coconut. At a condition of 6000 r/min, the mixed liquid is pulped with a high-speed refiner with pH adjusted to 7.0, and the same is put in a fermentation tank. Sterilizing is performed at 121° C. for 10 min, followed by cooling to room temperature, ready for use.

(2) Fermentation and Post-Treatment of Desiccated Coconut Suspension 54 g of glucose, 7.2 g of yeast extract powder, 9 g of malt extract powder, 3.6 g of $KH_2PO_4$, and 0.72 g of $MgSO_4·7H_2O$ are weighed, water is added for dissolution, and a volume is determined to be 1.8 L with pH adjusted to 6.0. A mixed liquid is distributed to twelve 1000 mL Erlenmeyer flasks with 150 mL of the liquid filled into each flask. Sterilizing is performed at 121° C. for 20 min, 1 ring of a lawn of the *Yarrowia lipolytica* CICC32520 (which is purchased from China Center of Industrial Culture Collection) slant strain is inoculated in after the flasks being cooled, and culturing is carried out at conditions of 180 r/min and 27° C. for 19 h, to obtain a shake flask culture solution of the *Yarrowia*.

1.8 L of the shake flask culture solution of the *Yarrowia* is inoculated into a fermentation tank, stirring is started, and a sterile air is introduced in so as to ferment for 96 h. During the fermenting process, a rotation speed of the stirring for the fermentation tank is controlled to 170 r/min, and a temperature for the fermenting is controlled to 27 to 28° C.; according to the demand for a dissolved oxygen of the fermenting, a ventilation ratio is gradually increased from 0.16 vvm to 0.48 vvm during the 0 to 24th hour of the fermenting, the ventilation ratio is controlled to 0.48 vvm during the 24th to 72nd hour of the fermenting, and the ventilation ratio is controlled to 0.32 vvm after 72 hours of the fermenting.

After the fermenting is complete, homogenizing is performed on a fermentation broth for 3 times under a pressure of 30 MPa with a high-pressure homogenizer, sterilizing is performed on the fermentation broth at 105° C. for 15 min, and evaporating and concentrating is performed on the fermentation broth to a volume of 30% under a condition of a vacuum degree of 0.07 MPa, and then spray drying is performed. During the spray drying process, a temperature of an inlet air is controlled to 190 to 200° C., and a temperature of an outlet air is controlled to 80 to 90° C. A dry powder cannot be obtained because of a high content of oil and fat.

The above-mentioned Examples are preferred embodiments of the present invention, but embodiments of the present invention are not limited by the above-mentioned Examples, and any other changes, modifications, substitutions, combinations, and simplifications made without departing from the spirit and principle of the present invention should be equivalent replacement modes, and are included within the protection scope of the present invention.

The invention claimed is:

1. A method of preparing a low-sugar and low-fat nutritional powder of desiccated coconut, the method comprising:

(1) a pretreatment of a desiccated coconut: mixing the desiccated coconut with water, and heating; then pulping the heat-treated desiccated coconut, homogenizing an obtained coconut milk, adjusting a pH value, and sterilizing, to obtain a desiccated coconut suspension; and (2) a fermentation and a post-treatment: inoculating a culture solution of *Yarrowia lipolytica* YD19 in the desiccated coconut suspension after being cooled, and fermenting; sterilizing an obtained fermentation broth, evaporating and concentrating under reduced pressure, spray drying, and pulverizing, to obtain the low-sugar and low-fat nutritional powder of desiccated coconut;

wherein the *Yarrowia lipolytica* YD19 has been deposited on Sep. 20, 2019 in Guangdong Microbial Culture Collection Center.

2. The method according to claim 1, wherein
the pH value in the step (1) is 6.0 to 7.0;
a condition for the heating in the step (1) is: heating at 20 to 130° C. for 30 to 60 minutes;
a condition for the pulping in the step (1) is: homogenating at a rotation speed of 6000 to 8000 r/min;
a pressure of the homogenizing in the step (1) is 30 to 40 MPa;
the culture solution of the *Yarrowia lipolytica* YD19 in the step (2) is a shake flask culture solution;
an inoculation amount of the culture solution of the *Yarrowia lipolytica* YD19 in the step (2) is 2% to 10% (v/v);
conditions for the fermenting in the step (2) are: a rotation speed for stirring is 140 to 200 r/min, a temperature for the fermenting is controlled to 26 to 28° C., a ventilation ratio for the fermenting is 0.16 to 0.48 vvm, and a time for the fermenting is 96 to 120 h;
a condition for the evaporating and concentrating under reduced pressure in the step (2) is: a vacuum degree of 0.07 to 0.08 MPa; and
conditions for the spray drying in the step (2) are: a temperature of an inlet air is controlled to be 160 to 200° C., and a temperature of an outlet air is controlled to be 70 to 90° C.

3. The method according to claim 2, wherein
a number of times for the homogenizing is 2 to 3 times;
a volume after the evaporating and concentrating under reduced pressure is 30% to 40% of an original volume.

4. The method according to claim 2, wherein
the culture solution of the *Yarrowia lipolytica* YD19 in the step (2) is prepared by the following steps: inoculating the *Yarrowia lipolytica* YD19 in a shake flask culture medium, and culturing under shaking to obtain the shake flask culture solution;
components of the shake flask culture medium are: glucose 25 to 35 g/L, yeast extract powder 3 to 5 g/L, malt extract powder 4 to 6 g/L, $KH_2PO_4$ 1 to 3 g/L, and $MgSO_4 \cdot 7H_2O$ 0.3 to 0.5 g/L, with the pH adjusted to 5.5 to 6.5;
an amount of the shake flask culture medium in the shake flask is 9% to 20% of a volume of the shake flask; and
a condition for the culturing under shaking is: culturing under 160 to 200 r/min at 26 to 28° C. for 18 to 20 h.

5. The method according to claim 1, wherein
the water in the step (1) is pure water;
a using amount of the water is calculated according to the mass ratio of desiccated coconut:water=1:(22 to 24).

6. The method according to claim 1, wherein
a condition for the sterilizing in the step (1) is: sterilizing at 115 to 121° C. for 10 to 30 min; and
a condition for the sterilizing in the step (2) is: sterilizing at 105 to 110° C. for 10 to 15 min.

7. The method according to claim 1, wherein a degree of the pulverizing in step (2) is to pulverize until particles reach 200-300 meshes.

8. A sugar and low fat nutritional powder of desiccated coconut, prepared by the method according to claim 1, wherein,
the sugar and low fat nutritional powder of desiccated coconut has a protein content of 21.8% to 24.4%, a dietary fiber content of 57.4% to 59.4%, a B-group vitamin content of 0.016% to 0.017%, and a fat content of 0.53% to 0.54%; and
the sugar and low fat nutritional powder of desiccated coconut does not contain glucose, fructose, sucrose or maltose.

* * * * *